(12) United States Patent
Debban et al.

(10) Patent No.: US 10,107,980 B1
(45) Date of Patent: Oct. 23, 2018

(54) OPTICAL FIBER CABLE WITH ROLLABLE RIBBONS CONTAINED IN A CENTRAL TUBE WITHOUT INTENDED STRANDING

(71) Applicant: OFS Fitel, LLC, Norcross, GA (US)

(72) Inventors: Harold P Debban, Snellville, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/835,778

(22) Filed: Dec. 8, 2017

(51) Int. Cl.
 *G02B 6/44* (2006.01)
(52) U.S. Cl.
 CPC ........ *G02B 6/4404* (2013.01); *G02B 6/4433* (2013.01); *G02B 6/4434* (2013.01); *G02B 6/4494* (2013.01); *G02B 6/448* (2013.01); *G02B 6/4413* (2013.01)
(58) Field of Classification Search
 CPC .............................. G02B 6/4403; G02B 6/4404
 See application file for complete search history.

(56) References Cited

U.S. PATENT DOCUMENTS

2016/0223769 A1\* 8/2016 Ito ..................... G02B 6/4405

OTHER PUBLICATIONS

Isaji, et al., "Ultra-High Density Wrapping Tube Optical Fiber Cable with 12-Fiber Spider Web Ribbon," International Wire & Cable Symposium, Proceedings of the 62nd IWCS Conference, pp. 605-609, 2013.\*

\* cited by examiner

*Primary Examiner* — Omar R Rojas
(74) *Attorney, Agent, or Firm* — John Harman, Esq.

(57) ABSTRACT

A optical fiber cable includes two or more non-twisted, rollable optical fiber ribbons within a central tube. The non-twisted, rollable optical fiber ribbons define a fiber packing density within the central tube of between 6.5 and 8.5 fibers per square millimeter.

18 Claims, 3 Drawing Sheets

OPTICAL FIBER CABLE WITH ROLLABLE RIBBONS CONTAINED IN A CENTRAL TUBE WITHOUT INTENDED STRANDING

BACKGROUND

An optical fiber cable generally comprises two or more optical fibers enclosed within a sheath or jacket. To accommodate demand for increased bandwidth without substantially increasing the cable diameter, the fiber count and fiber packing density may be increased. Optical fiber cables having high fiber counts and packing densities may present manufacturing challenges.

In an optical fiber cable, fibers or groups of fibers are commonly twisted together (also referred to as "stranded") to equalize strain. Loose or disorganized fibers are susceptible to undesirable interaction with each other during cable manufacturing and handling that can produce local areas of small-radius bending, resulting in undesirable signal attenuation. Optical fiber cables having only non-twisted fibers are not common and are generally limited to cables combining the characteristics of low fiber count, low packing density, and features that help minimize strain. An example of a cable having only non-twisted fibers is disclosed in U.S. Pat. No. 4,971,419 to Gartside et al.

An optical fiber ribbon comprises two or more parallel optical fibers that are joined together along their lengths. A material commonly referred to as a matrix adheres the fibers together. In a "flat" (also referred to as "encapsulated") type of optical fiber ribbon, the fibers may be fully encapsulated within the matrix material. The rigidity of encapsulated optical fiber ribbons presents challenges to achieving high fiber packing density in cables. So-called "rollable" optical fiber ribbons have been developed to achieve high fiber packing density in cables. In a rollable ribbon the matrix material is intermittently distributed along the fibers, providing sufficiently flexibility to roll up each individual ribbon about an axis parallel to the fibers or otherwise compact the ribbon into a fiber bundle with a roughly cylindrical shape. Two or more rollable ribbons can be grouped together into a compact bundle parallel to the axis of the fibers.

A machine known as a mass fusion splicer can splice two ribbons without requiring an operator to separate the individual fibers in the ribbons, thereby saving time. Due to the convenience of mass fusion splicing, ribbons are generally preferred over separate (i.e., "loose") fibers for high fiber count ribbons.

A conventional optical fiber cable structure may comprise two or more optical fiber ribbons that are twisted together. Techniques known in the art can be employed that achieve high packing densities, including, for example, packaging twisted ribbons or bundles of twisted ribbons in central tube or slotted cable structures.

SUMMARY

Embodiments of the invention relate to an optical fiber cable having a central tube and a plurality of non-twisted, rollable optical fiber ribbons within the central tube. The plurality of non-twisted, rollable optical fiber ribbons define a fiber packing density within the central tube of between 6.5 and 8.5 fibers per square millimeter.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
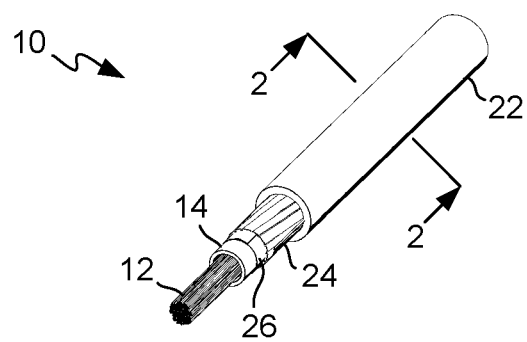
FIG. 1 is a perspective view of an optical fiber cable, in accordance with exemplary embodiments of the invention.
Figure 2A:
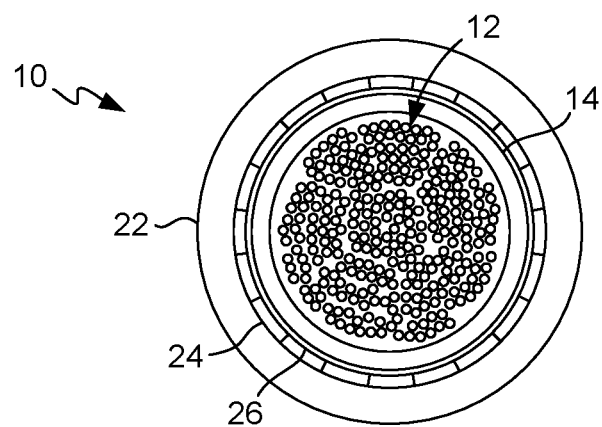
FIG. 2A is a cross-sectional view taken on line 2-2 of FIG. 1.
Figure 2B:
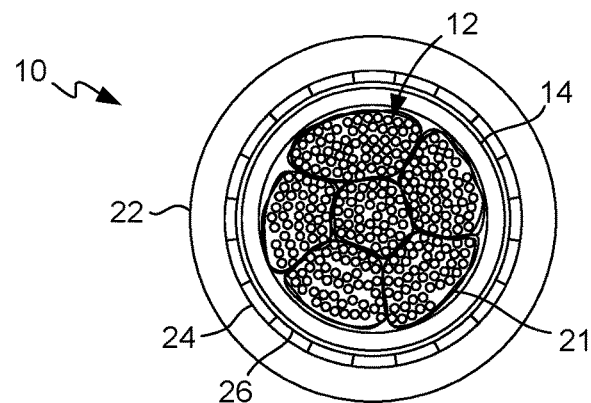
FIG. 2B is similar to FIG. 2A, illustrating an alternative exemplary embodiment.
Figure 3:
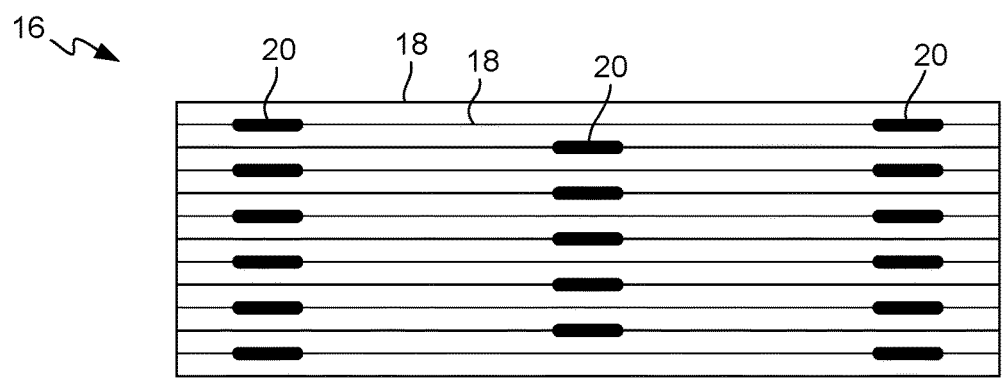
FIG. 3 is a top plan view of a portion of rollable optical fiber ribbon, in accordance with exemplary embodiments of the invention.
Figure 4:
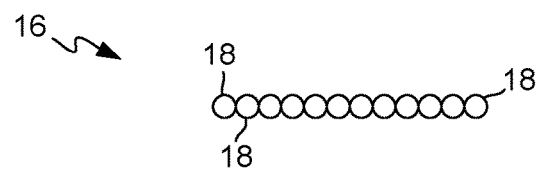
FIG. 4 is an end view of a portion of rollable optical fiber ribbon, in accordance with exemplary embodiments of the invention.

As illustrated in FIGS. 1-2A (not to scale), in an illustrative or exemplary embodiment of the invention, an optical fiber cable 10 includes a non-twisted, rollable optical fiber ribbon bundle 12 contained within a central tube 14. Bundle 12 may comprise a plurality of rollable optical fiber ribbons 16, an exemplary one of which is shown in FIGS. 3-4. As the meaning of "rollable" optical fiber ribbon is well understood by one of ordinary skill in the art, rollable optical fiber ribbon 16 (FIGS. 3-4) is not described in detail herein except to note that it comprises a plurality of optical fibers 18 joined to each other intermittently along their lengths with patches of adhesive, commonly referred to as a matrix material 20. The pattern of matrix material 20 shown in FIGS. 3-4 or other characteristics of rollable optical fiber ribbon 16 described herein are intended only as examples, and one of ordinary skill in the art will recognize that other types of rollable optical fiber ribbon are suitable.

Although each rollable optical fiber ribbon 16 has the ribbon shape shown in FIGS. 3-4 when laid flat with its optical fibers 18 arrayed parallel to each other, optical fibers 18 can also roll into or otherwise assume a compact bundle shape. For example, the plurality of individual optical fibers 18 of the plurality of rollable optical fiber ribbons 16 can together assume a compact shape represented generally by bundle 12 in FIGS. 1-2.

As used herein, the term "non-twisted" means that no twisting or stranding of rollable optical fiber ribbons 16 is employed in the manufacture of optical fiber cable 10. Accordingly, rollable optical fiber ribbons 16 lay essentially parallel to each other along the entire length of optical fiber cable 10. A small amount of unintended crossover of rollable optical fiber ribbons 16 or their optical fibers 18 at essentially random, infrequent intervals may occur naturally during manufacturing or handling, but this does not affect the characteristics described herein.

The non-twisted, rollable optical fiber ribbon bundle 12 defines a fiber packing density within central tube 14 of between 6.5 and 8.5 fibers per square millimeter (fibers/mm$^2$). That is, there are between 6.5 and 8.5 optical fibers 18 per square millimeter of cross-sectional area of central tube 14.

In a first example of optical fiber cable 10, there are 144 optical fibers 18 contained within central tube 14 at a packing density of about 7.8 fibers/mm$^2$. For example, there may be 12 rollable optical fiber ribbons 16, each having 12 optical fibers 18.

In a second example of optical fiber cable 10, there are 288 optical fibers 18 contained within central tube 14 at a packing density of about 8.2 fibers/mm$^2$. For example, there may be 24 rollable optical fiber ribbons 16, each having 12 optical fibers 18.

In a third example of optical fiber cable 10, there are 432 optical fibers 18 contained within central tube 14 at a packing density of about 8.0 fibers/mm$^2$. For example, there may be 36 rollable optical fiber ribbons 16, each having 12 optical fibers 18.

In a fourth example of optical fiber cable 10, there are 576 optical fibers 18 contained within central tube 14 at a packing density of about 8.1 fibers/mm$^2$. For example, there may be 48 rollable optical fiber ribbons 16, each having 12 optical fibers 18.

In a fifth example of optical fiber cable 10, there are 864 optical fibers 18 contained within central tube 14 at a packing density of about 7.8 fibers/mm$^2$. For example, there may be 72 rollable optical fiber ribbons 16, each having 12 optical fibers 18.

In the above-described first through fifth examples, there are a plurality of non-twisted rollable optical fiber ribbons 16 comprising no fewer than 144 and no more than 864 optical fibers 18 within central tube 14. In the above-described first through fifth examples, the plurality of non-twisted rollable optical fiber ribbons 16 define a fiber packing density within central tube 14 of between 7.8 and 8.2 fibers per square millimeter.

It should be understood that the number of optical fibers 18 may deviate slightly from the foregoing examples without substantially affecting the packing density. The total number of optical fibers 18 may be a multiple of the number of fibers in each rollable optical fiber ribbon 16. As optical fiber ribbons 16 having 4, 6, 8, 12, and 24 optical fibers 18 are known, the total number of optical fibers 18 (e.g., 144, 288, 432, 576, 864, etc.) may be multiples of 4, 6, 8, 12, or 24.

Note that rollable optical fiber ribbons 16 are relatively "loosely" packed within central tube 14, i.e., at a low fiber packing density relative to a conventional optical fiber cable having rollable ribbons contained within a central tube structure. For example, a conventional optical fiber cable (not shown) having a plurality of rollable ribbons twisted together within a central tube can commonly achieve a packing density of about 10.5 fibers/mm$^2$. Nevertheless, rollable optical fiber ribbons 16 are packed within central tube 14 at a higher fiber packing density than a conventional optical fiber cable having flat or encapsulated (i.e., not rollable) ribbons contained within a central tube structure. For example, a conventional optical fiber cable (not shown) having a plurality of flat or encapsulated ribbons twisted together within a central tube can commonly achieve a packing density of about 3.3 fibers/mm$^2$.

In the exemplary embodiment illustrated in FIGS. 1 and 2A, rollable optical fiber ribbons 16 float freely or unimpeded within central tube 14. In the exemplary embodiment illustrated in FIGS. 1 and 2A, rollable optical fiber ribbons 16 are not in contact with any structure or material that impedes their movement. For example, rollable optical fiber ribbons 16 are not suspended in any filler material, such as thixotropic gel commonly used in the art. Indeed, the interior of central tube 14 may be devoid of any such structure or material. That is, in the exemplary embodiment illustrated in FIGS. 1 and 2A the interior of central tube 14 is occupied solely by rollable optical fiber ribbons 16. Also, in the exemplary embodiment illustrated in FIGS. 1 and 2A optical fiber cable 10 contains no optical fibers other than those of the above-described plurality of non-twisted, rollable optical fiber ribbons 16.

Nevertheless, in alternative embodiments additional threads or yarns 21 (FIG. 2B) may be included within central tube 14 sufficiently loosely to not impede the movement of rollable optical fiber ribbons 16. For example, in embodiments where optical fiber cable 10 is to be used in an outdoor environment, such additional threads or yarns 21 may comprise dry water-swellable materials, such as superabsorbent yarns, within central tube 14 to block water ingress down the length of optical fiber cable 10. Alternatively or in addition, such additional threads or yarns 21 may comprise loosely-applied, color-coded organizing threads or yarns (e.g., polyester) to organize or subdivide rollable optical fiber ribbons 16 into subunits. For example, it may be desirable to organize or subdivide rollable optical fiber ribbons 16 into subunits in examples of optical fiber cable 10 having a very high fiber count, such as 432 or more optical fibers 18. In the exemplary embodiment illustrated in FIG. 2B, the interior of central tube 14 is occupied only by rollable optical fiber ribbons 16 and additional threads or yarns 21; the interior of central tube 14 is devoid of any other structure or material. Also, in the exemplary embodiment illustrated in FIG. 2B optical fiber cable 10 contains no optical fibers other than those of the above-described plurality of non-twisted, rollable optical fiber ribbons 16.

Optical fiber cable 10 may include additional features, such as an outer jacket 22 made of a flame-retardant material, and a plurality of reinforcing members 24 between outer jacket 22 and central tube 14. Reinforcing members 24 may comprise, for example, helically arranged fiberglass strands. A layer of water-blocking tape 26 may also be included between central tube 14 and reinforcing members 24.

Figure 5:
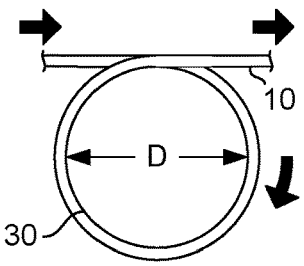
FIG. 5 is a side elevation view illustrating in generalized form a capstan of optical fiber cable manufacturing equipment engaging a portion of optical fiber cable, in accordance with exemplary embodiments of the invention.

Techniques for manufacturing optical fiber cable 10 will occur readily to one of ordinary skill in the art in view of the descriptions herein. For example, it will be understood that the plurality of rollable optical fiber ribbons 16 may be passed through a circular die (not shown) in a conventional manner to hold them in the compact shape represented generally by bundle 12 in FIGS. 1-2. It will also be understood that a drum capstan 30 (FIG. 5) may be used in a generally conventional manner to couple bundle 12 to the remainder of the cable structure. Nevertheless, a manufacturing challenge relating to achieving a target strain level on bundle 12 may be addressed in the following manner.

Figure 6:
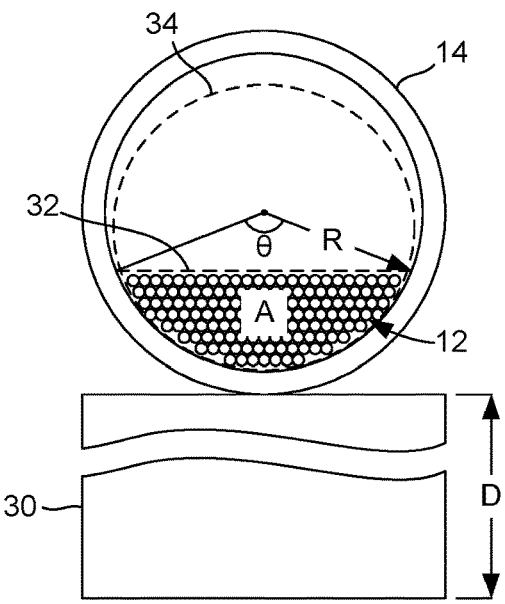
FIG. 6 is a conceptual illustration of optical fibers within a cross section of the central tube of the portion of optical fiber cable in FIG. 5.

As illustrated in FIG. 6, bundle 12 will follow a shorter path around drum capstan 30 than the remainder of the cable structure (i.e., central tube 14, etc.) because bundle 12 defines a relatively low fiber packing density in central tube 14, i.e., bundle 12 occupies only a relatively small fraction of the cross-sectional area of central tube 14. The tension imparted by drum capstan 30 tends to pull bundle 12 toward the side of central tube 14 in contact with drum capstan 30.

As understood by one of ordinary skill in the art, to achieve the target strain level on bundle 12, it is necessary to adjust one or more tensioning elements (not shown) associated with drum capstan 30. More specifically, such tensioning elements provide bundle 12 with the excess fiber length (EFL) relative to the surrounding cable structure that is needed to achieve the target strain level.

As well understood by one of ordinary skill in the art, drum capstan 30 and associated tensioning elements provide capstan 30 with an effective diameter (D), which can be adjusted. The rollable optical fiber ribbons 16 of which bundle 12 consists occupy an amount of cross-sectional area (A) that can readily be calculated. As shown in FIG. 6, for purposes of generalizing the calculation, the area A occupied by bundle 12 may be assumed to take the geometric shape of a circular segment on the side of central tube 14 in contact with drum capstan 30. The circular segment of area A is bounded by a chord 32 subtending an angle θ. Note that if instead of drum capstan 30 being used to manufacture optical fiber cable 10 it were used to manufacture a conventional optical fiber cable, the fiber bundle 34 (shown in broken line) of such a conventional, more densely packed, optical fiber cable would occupy a much larger, more circular area, perhaps almost all of central tube 14, and would commonly comprise twisted ribbons. The area A can be calculated as follows:

$$A = \frac{R^2}{2}(\theta - \sin\theta), \quad \text{(Eq. 1)}$$

where R is the radius of the interior of central tube 14.

Figure 7:
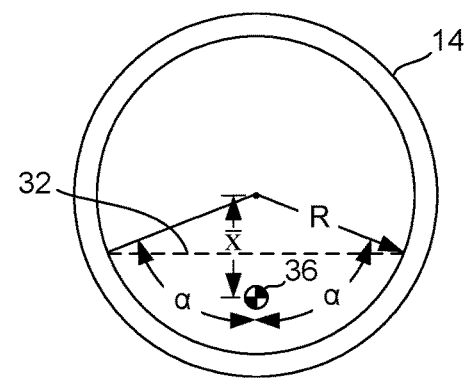
FIG. 7 illustrates a geometry for calculating a centroid of the optical fibers of FIG. 6.

As illustrated in FIG. 7, the location of the centroid 36 of the circular segment of area A can be calculated as follows:

$$\bar{x} = \frac{4R\sin^3(\alpha)}{3(2\alpha - \sin(2\alpha))}, \quad \text{(Eq. 2)}$$

where α=(½)θ.

As $\bar{x}$ is the radial distance from the center of central tube 14 to centroid 36, the location of centroid 36 is established. The length of central tube 14 (at its center) around drum capstan 30 is πD. The length of bundle 12 (at its centroid 36) around drum capstan 30 is $\pi(D-2\bar{x})$. Therefore, the ratio of $\pi(D-2\bar{x})$ to πD is directly related to the strain experienced by bundle 12:

$$\frac{D - 2\bar{x}}{D} \approx \text{strain level experienced by bundle 12.} \quad \text{(Eq. 3)}$$

The tensioning elements associated with drum capstan 30 can be adjusted to provide an effective diameter D that yields the target strain level. In view of the foregoing, optical fiber cable 10 can readily be manufactured using conventional techniques, even though rollable optical fiber ribbons 16 are only loosely packed, floating freely within central tube 14.

One or more illustrative or exemplary embodiments of the invention have been described above. However, it is to be understood that the invention is defined by the appended claims and is not limited to the specific embodiments described.

What is claimed is:

1. An optical fiber cable, comprising:
   a central tube; and
   a plurality of non-twisted rollable optical fiber ribbons within the central tube, the plurality of non-twisted rollable optical fiber ribbons defining a fiber packing density within the central tube of between 6.5 and 8.5 fibers per square millimeter, wherein an interior of the central tube is devoid of any material tightly binding the plurality of non-twisted rollable optical fiber ribbons.

2. The optical fiber cable of claim 1, wherein the plurality of non-twisted rollable optical fiber ribbons float unimpeded within the central tube.

3. The optical fiber cable of claim 1, wherein the interior of the central tube is devoid of any material in contact with the plurality of non-twisted rollable optical fiber ribbons.

4. The optical fiber cable of claim 1, wherein the interior of the central tube is devoid of any material in contact with the plurality of non-twisted rollable optical fiber ribbons except loosely-applied additional threads or yarns selected from the group consisting of: dry water-swellable and color-coded subunit organizing.

5. The optical fiber cable of claim 1, wherein the plurality of non-twisted rollable optical fiber ribbons comprises at least 144 optical fibers.

6. The optical fiber cable of claim 1, wherein the plurality of non-twisted rollable optical fiber ribbons comprises at least 12 rollable optical fiber ribbons.

7. The optical fiber cable of claim 1, wherein:
   the plurality of non-twisted rollable optical fiber ribbons consists of 12 rollable optical fiber ribbons, each having 12 optical fibers; and
   the plurality of non-twisted rollable optical fiber ribbons define a fiber packing density within the central tube of about 7.8 fibers per square millimeter.

8. The optical fiber cable of claim 1, wherein:
   the plurality of non-twisted rollable optical fiber ribbons consists of 24 rollable optical fiber ribbons, each having 12 optical fibers; and
   the plurality of non-twisted rollable optical fiber ribbons define a fiber packing density within the central tube of about 8.2 fibers per square millimeter.

9. The optical fiber cable of claim 1, wherein:
   the plurality of non-twisted rollable optical fiber ribbons consists of 36 rollable optical fiber ribbons, each having 12 optical fibers; and
   the plurality of non-twisted rollable optical fiber ribbons define a fiber packing density within the central tube of about 8.0 fibers per square millimeter.

10. The optical fiber cable of claim 1, wherein:
    the plurality of non-twisted rollable optical fiber ribbons consists of 48 rollable optical fiber ribbons, each having 12 optical fibers; and
    the plurality of non-twisted rollable optical fiber ribbons define a fiber packing density within the central tube of about 8.1 fibers per square millimeter.

11. The optical fiber cable of claim 1, wherein:
    the plurality of non-twisted rollable optical fiber ribbons consists of 72 rollable optical fiber ribbons, each having 12 optical fibers; and
    the plurality of non-twisted rollable optical fiber ribbons define a fiber packing density within the central tube of about 7.8 fibers per square millimeter.

12. The optical fiber cable of claim 1, further comprising:
    an outer jacket; and
    a plurality of reinforcing members between the jacket and the central tube.

13. The optical fiber cable of claim 12, further comprising water-blocking tape between the central tube and the reinforcing members.

14. The optical fiber cable of claim 13, wherein the reinforcing members comprise helically arranged fiberglass strands.

15. An optical fiber cable, comprising:
   a central tube; and
   a plurality of non-twisted rollable optical fiber ribbons comprising no fewer than 144 and no more than 864 optical fibers within the central tube, the plurality of non-twisted rollable optical fiber ribbons defining a fiber packing density within the central tube of between 7.8 and 8.2 fibers per square millimeter, wherein an interior of the central tube is devoid of any material tightly binding the plurality of non-twisted rollable optical fiber ribbons.

16. The optical fiber cable of claim 15, wherein the plurality of non-twisted rollable optical fiber ribbons float unimpeded within the central tube.

17. The optical fiber cable of claim 15, wherein the interior of the central tube is devoid of any material in contact with the plurality of non-twisted rollable optical fiber ribbons.

18. The optical fiber cable of claim 15, wherein the interior of the central tube is devoid of any material in contact with the plurality of non-twisted rollable optical fiber ribbons except loosely-applied additional threads or yarns selected from the group consisting of: dry water-swellable and color-coded subunit organizing.

* * * * *